United States Patent Office.

ADOLPHE MOT, OF WASHINGTON, DISTRICT OF COLUMBIA.

*Letters Patent No. 105,479, dated July 19, 1870.*

IMPROVEMENT IN MAKING BUTTER.

The Schedule referred to in these Letters Patent and making part of the same.

*To all whom it may concern:*

Be it known that I, ADOLPHE MOT, a citizen of the United States, residing in Washington, District of Columbia, have invented a new Process for Making Butter, of which the following is a specification.

I am aware that an attempt was made to obtain butter by burying cream under ground. That process, described in page 148, Patent Office Report, 1844, is based on the chemical action of damp earth. It does not separate the buttermilk, which otherwise would be lost.

My process is based on the principles of attraction and repulsion. By means of dry materials it separates and collects the buttermilk.

This double effect is obtained by placing cream in contact with any dry, porous substance, able to exert capillary attraction: in preference, sponge, baked clay, pumice-stone, charcoal, and by submitting cream and porous materials to centrifugal propulsion.

The operation is performed as follows:

Within a large tub place a smaller perforated tub, which is traversed by a central perpendicular shaft, and supplied with organs to receive circular motion. Fill the lower half of the small tub with any porous substance. Place upon it the cream tied in small bags. Fill the tub with porous substance; press down, cover, and let it rest.

When a large quantity of cream is acted upon or prompt result desired, the porous substance being wet, rapid motion must be given for a few minutes to the tub, in order to restore, help, or excite the attractive energy of the porous materials by drying them.

After a few hours perfect butter is taken out of the bags. Then give motion to the apparatus; the buttermilk is projected into the large tub; remove it; add water to wash the materials; give motion to dry them; all is ready for a new operation.

I claim as my invention—

1. The process of applying capillary attraction by means of dry, porous substances, to separate buttermilk from butter.

2. The application of a centrifugal machine with absorptive material, so as to separate butter from cream or milk, substantially as described.

ADOLPHE MOT.

Witnesses:
WILLIAM GRAY,
IMANUEL ENGEL.